(12) United States Patent
Borkowski

(10) Patent No.: US 9,669,346 B2
(45) Date of Patent: Jun. 6, 2017

(54) COMPRESSOR SYSTEM AND OIL SEPARATION SYSTEM

(71) Applicant: Ingersoll-Rand Company, Davidson, NC (US)

(72) Inventor: Michael R. Borkowski, Concord, NC (US)

(73) Assignee: Ingersoll-Rand Company, Davidson, NC (US)

( * ) Notice: Subject to any disclaimer, the term of this patent is extended or adjusted under 35 U.S.C. 154(b) by 218 days.

(21) Appl. No.: 14/289,316

(22) Filed: May 28, 2014

(65) Prior Publication Data

US 2015/0343365 A1 Dec. 3, 2015

(51) Int. Cl.

| | | |
|---|---|---|
| *B01D 49/00* | (2006.01) | |
| *B01D 50/00* | (2006.01) | |
| *B01D 45/08* | (2006.01) | |
| *B01D 46/00* | (2006.01) | |
| *B01D 46/44* | (2006.01) | |
| *F04B 39/04* | (2006.01) | |
| *F04B 39/16* | (2006.01) | |
| *F25B 31/00* | (2006.01) | |
| *F25B 43/02* | (2006.01) | |

(52) U.S. Cl.
CPC ........... *B01D 50/002* (2013.01); *B01D 45/08* (2013.01); *B01D 46/003* (2013.01); *B01D 46/44* (2013.01); *F04B 39/04* (2013.01); *F04B 39/16* (2013.01); *F25B 31/004* (2013.01); *F25B 43/02* (2013.01)

(58) Field of Classification Search
CPC ...... B01D 50/002; B01D 46/44; B01D 45/08; B01D 46/003; B01D 46/0086; B01D 45/16; F01M 2013/0433
See application file for complete search history.

(56) References Cited

U.S. PATENT DOCUMENTS

| | | | | |
|---|---|---|---|---|
| 1,871,546 | A * | 8/1932 | McClafferty | ........... F25B 43/02 55/446 |
| 2,508,132 | A | 5/1950 | Aikman | |
| 2,510,049 | A * | 5/1950 | Neeson | ..................... F16T 1/24 55/333 |
| 2,608,269 | A * | 8/1952 | Briggs | .................... F25B 43/02 55/515 |

(Continued)

FOREIGN PATENT DOCUMENTS

WO 2007075015 7/2007

*Primary Examiner* — Dung H Bui
(74) *Attorney, Agent, or Firm* — Taft Stattinius & Hollister LLP

(57) ABSTRACT

A unique compressor system includes a compressor and an oil separation system. The oil separation system may include an oil separator element in fluid communication with a compressor discharge; an oil reservoir in fluid communication with the oil separator element that receives and accumulates separated oil; an oil-level controlled valve to control the flow of the oil from the oil reservoir to the compressor; and a check valve in fluid communication with the oil reservoir, the check valve being structured to prevent a reverse oil flow into the oil reservoir. A unique oil separation system, includes an oil separator element; an oil reservoir to accumulate separated oil; an oil-level controlled valve to control the flow of the from the oil reservoir; and a check valve to prevent a reverse oil flow into the oil reservoir.

18 Claims, 2 Drawing Sheets

(56) References Cited

U.S. PATENT DOCUMENTS

| | | | | |
|---|---|---|---|---|
| 3,093,466 A * | 6/1963 | Zankey | B01D 53/26 | |
| | | | 137/195 | |
| 3,390,773 A * | 7/1968 | Merten | B01D 61/12 | |
| | | | 210/125 | |
| 3,778,977 A * | 12/1973 | Conn | B01D 50/00 | |
| | | | 55/325 | |
| 3,966,437 A * | 6/1976 | DeWolf | B01D 46/46 | |
| | | | 137/145 | |
| 4,343,599 A | 8/1982 | Kousokabe | | |
| 4,553,991 A * | 11/1985 | Barsacq | A47L 5/38 | |
| | | | 15/301 | |
| 4,562,855 A | 1/1986 | Cummings et al. | | |
| 4,685,486 A | 8/1987 | Yokoyama | | |
| 4,856,550 A | 8/1989 | Smelcer | | |
| 4,878,923 A * | 11/1989 | Muller | B01D 46/0031 | |
| | | | 55/355 | |
| 5,158,585 A * | 10/1992 | Saho | B01D 46/0009 | |
| | | | 55/338 | |
| 5,302,300 A * | 4/1994 | Porri | B01D 5/009 | |
| | | | 210/177 | |
| 5,487,769 A * | 1/1996 | Hutchinson | B01D 45/06 | |
| | | | 55/442 | |
| 5,692,389 A * | 12/1997 | Lord | F25B 5/02 | |
| | | | 62/218 | |
| 5,803,715 A * | 9/1998 | Kitchener | B01D 46/003 | |
| | | | 417/295 | |
| 6,048,376 A * | 4/2000 | Miller | B01D 50/002 | |
| | | | 55/320 | |
| 6,599,109 B2 | 7/2003 | Zamudio et al. | | |
| 6,846,348 B2 * | 1/2005 | Kitchener | B01B 53/18 | |
| | | | 261/114.4 | |
| 8,133,309 B2 | 3/2012 | Smith et al. | | |
| 8,388,746 B2 * | 3/2013 | Warren | B01D 46/0031 | |
| | | | 55/310 | |
| 2004/0197622 A1 * | 10/2004 | Wheat | B01D 45/12 | |
| | | | 429/413 | |
| 2005/0145223 A1 * | 7/2005 | Nozaki | F02D 33/006 | |
| | | | 123/516 | |
| 2005/0235948 A1 * | 10/2005 | Hayasaka | F02M 59/102 | |
| | | | 123/255 | |
| 2007/0107425 A1 | 5/2007 | Appleton | | |
| 2008/0078618 A1 * | 4/2008 | Lee | F04C 18/356 | |
| | | | 184/6.2 | |
| 2008/0152519 A1 * | 6/2008 | Chern | B01D 45/16 | |
| | | | 417/430 | |
| 2009/0282848 A1 * | 11/2009 | Takegami | F25B 13/00 | |
| | | | 62/222 | |
| 2010/0326125 A1 * | 12/2010 | Sakae | F25B 13/00 | |
| | | | 62/470 | |
| 2014/0033922 A1 * | 2/2014 | Peck | F01M 13/04 | |
| | | | 95/272 | |
| 2015/0343356 A1 * | 12/2015 | Sugio | B60T 17/004 | |
| | | | 55/462 | |

* cited by examiner

COMPRESSOR SYSTEM AND OIL SEPARATION SYSTEM

FIELD OF THE INVENTION

The present invention relates to compressor systems, and more particularly to a oil separation systems and compressors having oil separation systems.

BACKGROUND

Compressor systems, such as oil lubricated compressor system, remain an area of interest. Some existing systems have various shortcomings, drawbacks, and disadvantages relative to certain applications. For example, some oil separation systems employed with or as part of compressor systems may not adequately separate oil from air. Accordingly, there remains a need for further contributions in this area of technology.

SUMMARY

Embodiments of the present invention include a unique compressor system having a compressor and an oil separation system. The oil separation system may include an oil separator element in fluid communication with a compressor discharge; an oil reservoir in fluid communication with the oil separator element that receives and accumulates separated oil; an oil-level controlled valve to control the flow of the oil from the oil reservoir to the compressor; and a check valve in fluid communication with the oil reservoir, the check valve being structured to prevent a reverse oil flow into the oil reservoir. Embodiments also include a unique oil separation system having an oil separator element; an oil reservoir to accumulate separated oil; an oil-level controlled valve to control the flow of the from the oil reservoir; and a check valve to prevent a reverse oil flow into the oil reservoir.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
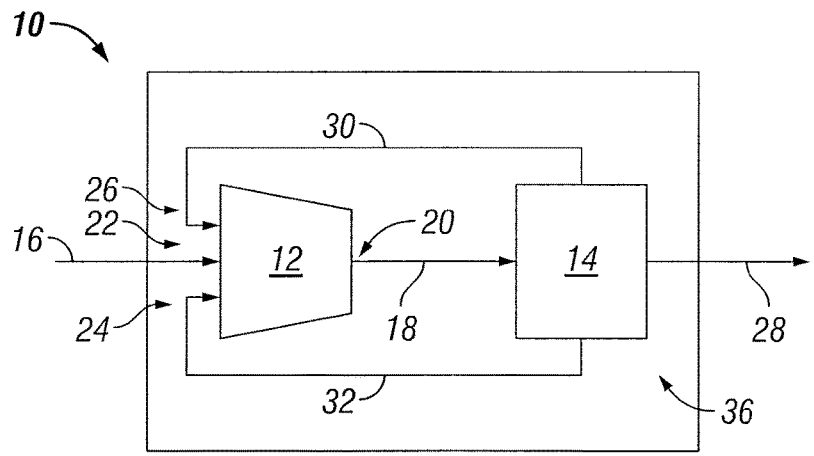
FIG. 1 schematically depicts some aspects of a compressor system having an oil separation system in accordance with a non-limiting example of some embodiments of the present invention.

For purposes of promoting an understanding of the principles of the invention, reference will now be made to the embodiments illustrated in the drawings, and specific language will be used to describe the same. It will nonetheless be understood that no limitation of the scope of the invention is intended by the illustration and description of certain embodiments of the invention. In addition, any alterations and/or modifications of the illustrated and/or described embodiment(s) are contemplated as being within the scope of the present invention. Further, any other applications of the principles of the invention, as illustrated and/or described herein, as would normally occur to one skilled in the art to which the invention pertains, are contemplated as being within the scope of the present invention.

Referring now to FIG. 1, some aspects of a nonlimiting example of a compressor system 10 in accordance with some embodiments of the present invention are schematically depicted. Compressor system 10 includes a compressor 12 and an oil separation system 14. Compressor 12 is operative to receive and compress a gas 16, e.g., air, using oil as a sealing and lubricating agent, and to discharge a compressed two-phase air/oil mixture 18 via a compressor discharge 20. In one form, compressor 12 is a flooded rotary screw compressor. In other embodiments, compressor 12 may take other forms. Compressor 12 includes an air inlet 22 for receiving air 16, and includes oil inlets 24 and 26 for receiving the oil. In some embodiments, oil inlets 24 and 26 are combined or coupled together. Oil separation system 14 is in fluid communication with compressor discharge 20. Oil separation system 14 is operative to receive air oil mixture 18, to discharge compressed air 28 substantially free of oil, and to return oil that is substantially free of air to oil inlets 24 and 26 via oil return lines 30 and 32. In various embodiments, oil return lines 30 and 32 may be, for example, one or more tubes, pipes, machined or caste passages or the like. In some embodiments, only a single oil return line may be employed.

Figure 2:
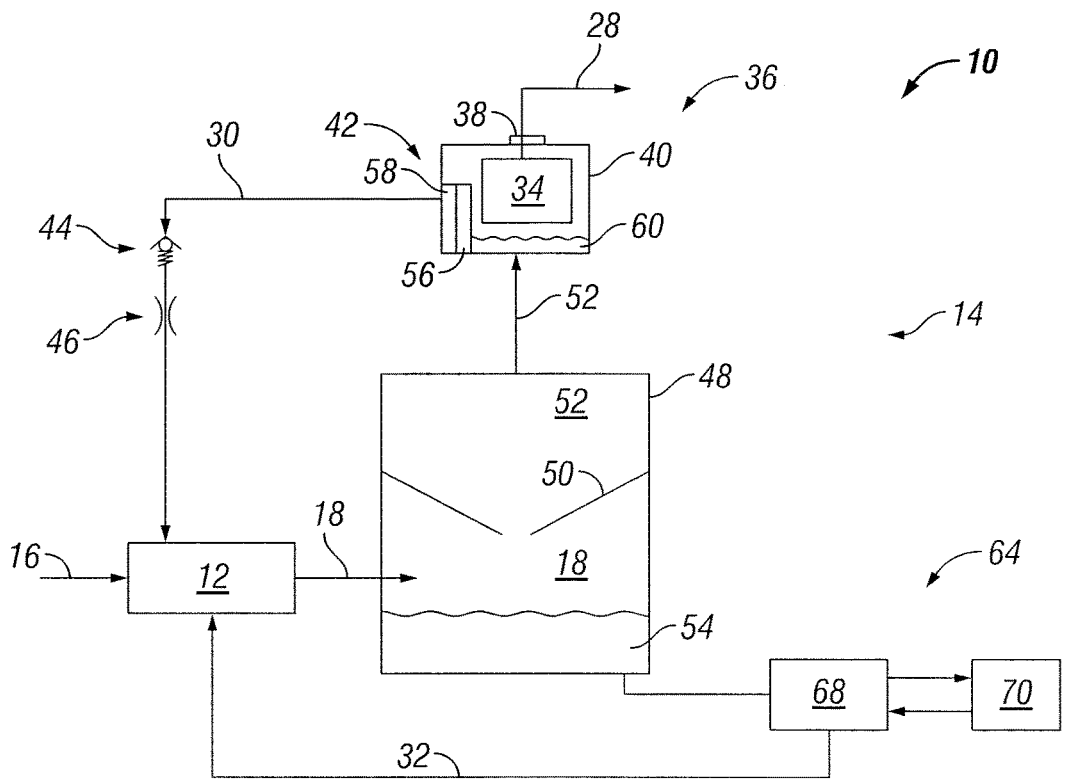
FIG. 2 schematically illustrates some aspects of a compressor system with an oil separation system in accordance with a non-limiting example of some embodiments of the present invention.
Figure 3A:
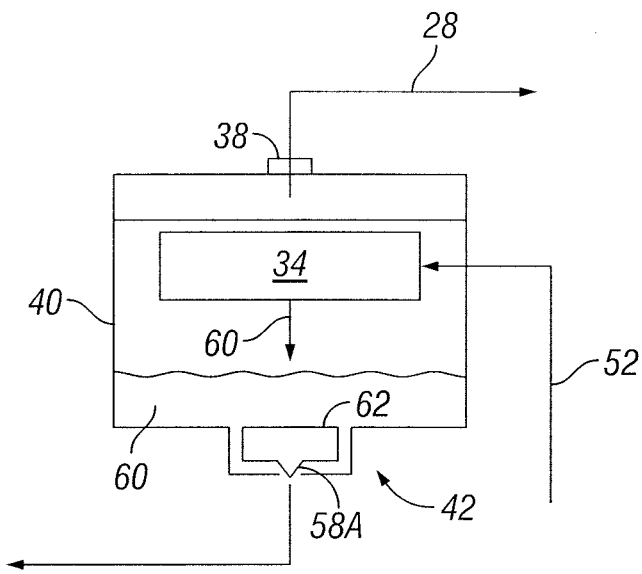
FIGS. 3A and 3B schematically illustrate some aspects of non-limiting examples of valving schemes in accordance with a non-limiting examples of some embodiments of the present invention.
Figure 3B:
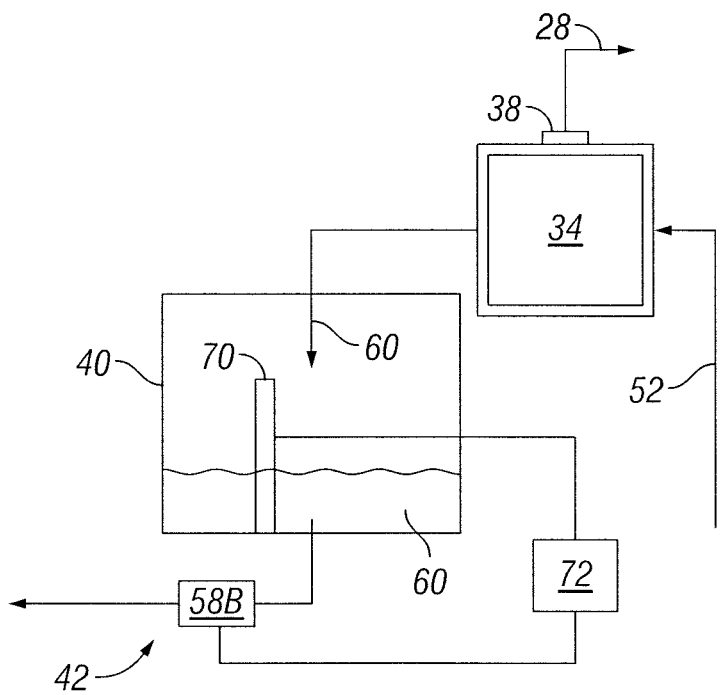

Referring now to FIGS. 2, 3A and 3B oil separation system 14 includes an oil separator element 34, a pressure vessel 36; an air discharge port 38 for discharging compressed air 28, an oil reservoir 40, and oil-level controlled valve 42, a check valve 44, an oil flow restrictor 46, such as an orifice, and oil tank 48, and oil separator element 50. Oil separator element 34 Is disposed in pressure vessel 36. In one form, pressure vessel 36 is oil reservoir 40. In other embodiments, pressure vessel 36 may be oil tank 48, or may be another pressure vessel. Oil separator element 34 and pressure vessel 36 are in fluid communication with compressor discharge 20 and with air discharge port 38. In some embodiments, oil separator element 34 may be disposed in oil tank 48, in such embodiments, oil tank 48 is considered to be pressure vessel 36. In one form, oil separator element 34 is a replaceable oil separator element, which may be replaced, e.g., after its performance degrades.

Oil separator elements 34 and 50 are structured to separate oil from air from the 2-phase air/oil mixture received from compressor 12. In various embodiments, oil separator element 34 and oil separator element 50 may take one or more forms, and may be or may include, for example, baffles, coalescers (e.g., mesh-type coalescers, vane packs or one or more other types of coalescers), demisters and/or a rotating separators of one or more of various types. In one form, oil separator element 50 and oil tank 48 are structured to separate a substantial amount of the oil from the air to yield a reduced-oil-content air/oil mixture 52. Oil return line 30 is in fluid communication with the oil inlet 24 and oil reservoir 40. Oil return line 30 is structured to channel oil that has been separated from air from the air/oil mixture received from compressor 12 to oil inlet 24.

Air discharge port 38 is in fluid communication with oil separator 34. Air discharge port 38 is operative to deliver compressed air as an output product of compressor system 10. The compressed air delivered via air discharge port 38 has oil separated therefrom by oil separator elements 34 and 50. In some embodiments, substantially all of the oil is separated from the compressed air, in which case air discharge port 38 delivers compressed air that is substantially free of oil. The degree of air/oil separation or oil removal from the compressed two-phase mixture received from compressor 12 may vary with the needs of the application.

Oil reservoir 40 is in fluid communication with oil separator element 34. Oil reservoir 40 is structured to receive and accumulate oil that is separated from the two-phase air/oil mixture received from compressor 12. In one form, oil reservoir 40 is structured to receive and accumulate oil that is separated from the reduced-oil-content air/oil mixture 52. In other embodiments, oil reservoir 40 may be structured to receive and accumulate oil that is separated from the air/oil mixture received directly from compressor 12.

Oil tank 48 is in fluid communication with oil separator element 34, oil reservoir 40 and with oil inlet 26 via oil return line 32. In one form, oil separator 34 is in fluid communication with compressor discharge 20 via oil tank 48. Oil tank 48 is operative to direct reduced-oil-content air/oil mixture 52 to oil separator element 34, which separates oil from air from reduced-oil-content air/oil mixture 52, e.g., most or substantially all of the oil in reduced-oil-content air/oil mixture 52. Oil separator element 50 is disposed in oil tank 48. In some embodiments, oil separator element 34 may be the only oil separator element in oil separation system 14. In other embodiments, other oil separation elements may be employed in addition to oil separator elements 34 and 50. Oil return line 32 is in fluid communication with oil inlet 26 and oil tank 48. Oil return line 32 is structured to channel oil 54 that has been separated from air from the air/oil mixture received from compressor 12 to oil inlet 26. It will be understood that some embodiments may not include oil tank 48, oil separator element 50 and oil return line, but instead, may employ only pressure vessel 36, oil separator element 34 and oil return line 30, along with associated components described herein. In some embodiments, compressor system 10 may include a cooling system 64 for cooling the sump oil 54 in oil tank 48 prior to delivery to compressor 12 via oil return line 32. In some embodiments, cooling system may include a thermal valve 68 and an oil cooler 70.

Oil-level controlled valve 42 is in fluid communication with oil inlet 26 and oil reservoir 40. Oil-level controlled valve 42 is structured to control the flow of the oil from oil reservoir 40 to oil inlet 24, e.g., via oil return line 30. Oil-level controlled valve 42 structured to control the flow of oil from oil reservoir 40 to oil inlet 24 via oil return line 30. Check valve 44 is in fluid communication with oil reservoir 40 and oil inlet 24. Check valve 44 is structured to prevent a reverse flow oil into oil reservoir 40, e.g. from oil return line 30. In various embodiments, check valve 44 may be disposed in compressor 12, oil inlet 24, oil return line 30, oil reservoir 40 or any other suitable location. Oil flow restrictor 46 is in fluid communication with oil return line 30, oil reservoir 40 and oil inlet 24. Oil flow restrictor 46 is structured to restrict the flow of oil in oil return line 30, e.g., oil received into oil inlet 24 to a predetermined flow rate, for example, a flow rate that provides a sufficient amount of oil for operating compressor 12. In various embodiments, oil flow restrictor 46 may be disposed in compressor 12, oil inlet 24, oil return line 30, oil reservoir 40 or any other suitable location.

Oil-level controlled valve 42 includes an oil level sensor 56 and a valve element 58. Valve element 58 is in fluid communication with oil reservoir 40 and oil return line 30. In one form, valve element 58 is disposed in oil reservoir 40. In other embodiments, valve element 58 may be disposed in oil reservoir 40 and/or oil return line 30. In still other embodiments, valve element 58 may be disposed in compressor 12, oil inlet 24 or any other suitable location. In various embodiments, valve element 58 may be structured to default to an open position in the event of failure and/or may be a normally open valve. Valve element 58 is coupled to oil level sensor 56. Valve element 58 is coupled to oil level sensor 56. In some embodiments, e.g., that of FIG. 3A, valve element 58 is mechanically coupled to oil level sensor 56. In other embodiments, e.g., that of FIG. 3B, valve element 58 may in electrical communication with valve element 58. Oil-level controlled valve 42 is in fluid communication with oil reservoir 40 and oil return line 30. Oil level sensor 56 is structured to sense an oil level of scavenge oil 60 in oil reservoir 40 that has been separated from air by oil separator element 34.

Oil level sensor 56 is structured to provide a mechanical and/or non-mechanical input to control the displacement of valve element 58 in order to control the flow of oil 60 received from reservoir 40 into oil return line 30. In some embodiments, oil level sensor 56 and valve element 58 are structured to control the flow of oil from pressure vessel 36 or oil reservoir 40, and to maintain a desired minimum oil level in pressure vessel 36 or oil reservoir 40, e.g., in order to prevent an unseparated air/oil mixture from entering oil return line 30.

In the embodiment of FIG. 3A, valve element 58 is a mechanically actuated valve element 58A. In the embodiment of FIG. 3A, oil separator element 34 is disposed in oil reservoir 40, which is thus considered to be pressure vessel 36. In other embodiments having mechanically actuated valve elements 58, oil separator 34 may be disposed in a separate pressure vessel 36 that is in fluid communication with oil reservoir 40 and air discharge port 38. In the embodiment of FIG. 3A, oil level sensor 56 is a float 62. In other embodiments, oil level sensor 56 may take other forms. Float 62 is structured to mechanically displace valve element 58 to control the flow of oil out of oil reservoir 40 and through oil return line 32.

In the embodiment of FIG. 3B, valve element 58 is electrically actuated. In the embodiment of FIG. 3B, oil separator element 34 is disposed in pressure vessel 36, and pressure vessel 36 is in fluid communication with oil tank 48. In other embodiments having electrically actuated valve elements 58, oil separator 34 may be disposed in oil tank 48. In one form, valve 58 in the embodiment of FIG. 3B is a solenoid valve 58B, and oil level sensor 56 is an electrical oil level sensor 70. Electrical oil level sensor 70 is structured to provide a signal corresponding to scavenge oil 60 level for controlling the solenoid valve 58B. Electrical oil level sensor 70 may take any suitable form, and may sense the oil level based on, for example, capacitance, inductance, resistance, impedance, optical data and/or other electrical and/or electromagnetic and/or optical data pertaining to scavenge oil 60 level. Solenoid valve 58B and electrical sensor 70 are in electrical communication with a controller 72. Controller 72 is operative to control solenoid valve 58B based on signals received from electrical sensor 70.

Embodiments of the present invention include a compressor system, comprising: a compressor having an air inlet, a compressor discharge and at least one oil inlet, wherein the compressor is operative to discharge a compressed two-phase air/oil mixture via the compressor discharge; an oil separation system, including: an oil separator element in fluid communication with the compressor discharge, the oil separator element being structured to separate oil from air; an air discharge port in fluid communication with the oil separator element and operative to deliver the air as an output product of the compressor system, the air having at least some oil separated therefrom by the oil separator element; an oil reservoir in fluid communication with the oil separator element and structured to receive and accumulate the oil; an oil return line in fluid communication with the at least one oil inlet and the oil reservoir, and is structured to channel the separated oil to the at least one oil inlet; an oil-level controlled valve in fluid communication with the at least one oil inlet and the oil reservoir, the oil-level controlled valve being structured to control a flow of the oil from the oil reservoir to the at least one oil inlet via the oil return line; and a check valve in fluid communication with the oil reservoir and the at least one oil inlet, the check valve being structured to prevent a reverse oil flow into the oil reservoir from the oil return line.

In a refinement, the compressor system further comprises an oil flow restrictor in fluid communication with the oil return line, the oil reservoir and the at least one oil inlet, the oil flow restrictor being structured to restrict a flow of oil received into the at least one oil inlet to a predetermined flow rate.

In another refinement, the oil-level controlled valve includes an oil level sensor, and a valve element coupled to the oil level sensor and in fluid communication with the oil reservoir and the oil return line.

In yet another refinement, the oil level sensor is a float.

In still another refinement, the float is structured to mechanically displace the valve element.

In yet still another refinement, the valve element is an electrically actuated valve element, wherein the oil level sensor is structured to provide a signal corresponding to oil level for controlling the electrically actuated valve element.

In a further refinement, the valve element is a solenoid valve.

In a yet further refinement, the compressor system further comprises a controller configured to control the electrically actuated valve element based on input received from the oil level sensor In a still further refinement, the oil separator element is a coalescer.

In a yet still further refinement, the oil separation system further comprises an oil tank in fluid communication with the at least one oil inlet and the oil separator element, wherein the oil separator element is in fluid communication with the compressor discharge via the oil tank.

In an additional refinement, the oil separator element is a first oil separator element, further comprising a second oil separator element disposed in the oil tank, wherein the second oil separator element and the oil tank are structured to separate oil from air in the air/oil mixture, and wherein the tank is operative to direct a reduced-oil-content air/oil mixture to the first oil separator element.

In another additional refinement, the second oil separator element is a baffle.

Embodiments of the present invention include an oil separation system for a compressor, comprising: an oil separator element structured to separate oil from air from a compressed air/oil mixture; an air discharge port in fluid communication with the oil separator element and operative to discharge the air; an oil reservoir in fluid communication with the oil separator element and structured to receive and accumulate the oil; an oil return line in fluid communication the oil reservoir and structured for fluid communication with the compressor to discharge oil to the compressor; an oil-level controlled valve in fluid communication with the oil reservoir and the oil return line, wherein the oil-level controlled valve controls a flow of the oil from the oil reservoir to the compressor; and a check valve in fluid communication with the reservoir and the oil return line, wherein the check valve is structured to prevent a reverse oil flow into the reservoir from the oil return line.

In a refinement, the oil separation system further comprises an orifice in fluid communication with the oil return line and the oil reservoir, wherein the orifice is structured to restrict a flow of oil from the oil reservoir.

In another refinement, the oil-level controlled valve includes an oil level sensor and a valve element coupled to the oil level sensor and in fluid communication with the oil reservoir and the oil return line.

In yet another refinement, the oil level sensor is a float structured to displace the valve element; and wherein the valve element and the float are configured to retain a minimum oil level in the oil reservoir.

In still another refinement, the valve element is solenoid valve; and wherein the oil level sensor provides a signal to control a position of the solenoid valve.

Embodiments of the present invention include a compressor system, comprising: a compressor operative to discharge an air/oil mixture; means for separating oil from air and returning the oil to the compressor, wherein the means for separating includes means for restricting a flow of the oil to the compressor.

In a refinement, the means for separating includes means for valving a flow of the oil to the compressor.

In another refinement, the means for valving includes means for retaining a minimum oil level in the means for separating.

While the invention has been described in connection with what is presently considered to be the most practical and preferred embodiment, it is to be understood that the invention is not to be limited to the disclosed embodiment (s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. A compressor system, comprising:
    a compressor having an air inlet, a compressor discharge and at least one oil inlet, wherein the compressor is operative to discharge a compressed two-phase air/oil mixture via the compressor discharge;
    an oil separation system, including:
        a first oil separator element in fluid communication with the compressor discharge, the first oil separator element being structured to separate oil from air;
        an air discharge port in fluid communication with the oil separator element and operative to deliver the air as an output product of the compressor system, the air having at least some oil separated therefrom by the first oil separator element;
an oil reservoir in fluid communication with the first oil separator element and structured to receive and accumulate the oil;
a first oil return line in fluid communication with a first oil inlet of the at least one oil inlet and the oil reservoir, the first oil return line structured to channel the separated oil to the first oil inlet;
an oil-level controlled valve in fluid communication with the first oil inlet and the oil reservoir, the oil-level controlled valve being structured to control a flow of the oil from the oil reservoir to the first oil inlet via the first oil return line;
a check valve positioned in the first oil return line between the oil reservoir and the compressor, the check valve being in fluid communication with the oil reservoir and the first oil inlet, the check valve structured to prevent a reverse oil flow into the oil reservoir from the oil return line;
an oil tank in fluid communication with a second oil inlet and the first oil separator element, wherein the first oil separator element is in fluid communication with the compressor discharge via the oil tank;
wherein the first oil separator element is disposed in the oil reservoir;
a second oil separator element disposed in the oil tank, wherein the second oil separator element and the oil tank are structured to separate oil from air in the air/oil mixture, and wherein the oil tank is operative to direct a reduced-oil-content air/oil mixture to the first oil separator element;
a second oil return line in fluid communication between the oil tank and a second oil inlet to the compressor; and
a thermal valve and an oil cooler in fluid communication with the second oil return line.

2. The compressor system of claim 1, further comprising an oil flow restrictor in fluid communication with one of the first and second oil return lines, the oil flow restrictor being structured to restrict a flow of oil received into the at least one of the first and second oil inlets to a predetermined flow rate.

3. The compressor system of claim 1, wherein at least one of the first and second oil separator elements is a coalescer.

4. The compressor system of claim 1, wherein at least one of the first and second oil separator elements is a baffle.

5. The compressor system of claim 1, wherein the oil-level controlled valve includes an oil level sensor, and a valve element coupled to the oil level sensor and in fluid communication with the oil reservoir and the first oil return line.

6. The compressor system of claim 5, wherein the oil level sensor is a float.

7. The compressor system of claim 6, wherein the float is structured to mechanically displace the valve element.

8. The compressor system of claim 5, wherein the valve element is an electrically actuated valve element, wherein the oil level sensor is structured to provide a signal corresponding to oil level for controlling the electrically actuated valve element.

9. The compressor system of claim 8, wherein the valve element is a solenoid valve.

10. The compressor system of claim 8, further comprising a controller configured to control the electrically actuated valve element based on input received from the oil level sensor.

11. An oil separation system, comprising:
a compressor;
a first oil separator element structured to separate oil from air from a compressed air/oil mixture;
an air discharge port in fluid communication with the first oil separator element and operative to discharge the air;
a scavenge oil reservoir in fluid communication with the first oil separator element and structured to receive and accumulate the oil;
a first oil return line in fluid communication the scavenge oil reservoir and structured for fluid communication with the compressor to discharge oil to the compressor through a first oil inlet;
an oil-level controlled valve in fluid communication with the scavenge oil reservoir and the first oil return line, wherein the oil-level controlled valve controls a flow of the scavenge oil from the oil reservoir to the compressor; and
a check valve positioned in the first oil return line between the scavenge oil reservoir and the compressor, the check valve being in fluid communication with the scavenge oil reservoir and the first oil return line, wherein the check valve is structured to prevent a reverse oil flow into the scavenge oil reservoir from the first oil return line;
an oil tank in fluid communication with the scavenge oil reservoir and the first oil separator element;
a second oil separator element disposed in the oil tank structured discharge a reduced-oil-content air/oil mixture to the oil separator element; and
a second oil return line constructed to provide fluid communication between the oil tank and the compressor to return oil to the compressor through a second oil inlet; and
a thermal valve and an oil cooler in fluid communication with the second oil return line.

12. The oil separation system of claim 11, further comprising an orifice in fluid communication with the first oil return line and the scavenge oil reservoir, wherein the orifice is structured to restrict a flow of oil from the oil reservoir.

13. The oil separation system of claim 11, wherein the oil-level controlled valve includes an oil level sensor and a valve element coupled to the oil level sensor and in fluid communication with the scavenge oil reservoir and the first oil return line.

14. The oil separation system of claim 13, wherein the oil level sensor is a float structured to displace the valve element; and wherein the valve element and the float are configured to retain a minimum oil level in the scavenge oil reservoir.

15. The oil separation system of claim 13, wherein the valve element is solenoid valve; and wherein the oil level sensor provides a signal to control a position of the solenoid valve.

16. A method comprising:
compressing a flow of air and oil in an oil flooded compressor;
separating the air and the oil with a first separator in an oil tank;
separating the air and the oil with a second separator downstream of the first separator;
discharging the oil to an on reservoir through a first conduit and discharging the air through a second conduit after separating in the second separator;

moving the separated oil through a first oil return line from the first separator and controlling a flow of oil to an oil cooler with a thermal valve prior to returning oil to the compressor;

moving the separated oil through a second oil return line from the second separator to the compressor;

preventing air from flowing with the oil in the second oil return line to the compressor with an oil level control valve; and preventing a reverse flow of oil in the second oil return line with a check valve.

17. The method of claim 16, wherein the preventing of air flow in the second oil return line includes operating a valve system to prevent all of the oil in the reservoir at any operating point from entering the oil return line.

18. The method of claim 16, wherein the preventing of reverse flow of oil in the second oil return line includes positioning a check valve in the second oil return line.

\* \* \* \* \*